Patented Sept. 25, 1951

2,569,114

UNITED STATES PATENT OFFICE 2,569,114

METHOD OF PRODUCING LACTAMS AND THEIR HYDROLYTIC PRODUCTS

Alois Novotny, Prague, Czechoslovakia

No Drawing. Application April 5, 1948, Serial No. 19,175. In Czechoslovakia September 8, 1947

9 Claims. (Cl. 260—239.3)

The best prior art method of producing lactams, consisted in the rearrangement of cyclic oximes in a concentrated sulphuric acid solution at elevated temperatures. This reaction is highly exothermic, thereby necessitating special measures for its control. The cyclic oximes may be prepared from ketones by reacting them with hydroxylaminedisulfonic salts or with hydroxylamine salts. These oximes must be isolated in a pure form, carefully dried and cautiously dissolved in sulphuric acid. Applicant has therefore developed a method of producing lactams, starting directly from cyclic ketones, hydroxylaminesulphate and, sulphuric or fuming sulphuric acid, without isolating the intermediate oxime. Hydroxylaminesulphate, however, is relatively expensive for industrial purposes.

Neither the reaction of dicarboxylic acids with ammonia in the presence of dehydrating and dehydrogenating agents nor the method starting from 5-valerolactam gives quite satisfactory results. These known methods yield considerable amounts of secondary products.

It has now been found that it is possible to produce lactams in a very advantageous manner by reacting mononitro-paraffins with cyclic ketones at elevated temperatures in the presence of hydrates of sulphur trioxide, such as sulphuric or fuming sulphuric acid. The mononitroparaffins can be prepared in a cheap and easy way. The reaction may be carried out in different ways. One of the methods comprises the addition of both the mononitroparaffin and the cyclic ketone simultaneously and progressively into a preheated sulphuric or fuming sulphuric acid solution. This method can be made continuous by withdrawing the reaction products continuously from a reaction kettle which may be heated or cooled as needed, and simultaneously adding the cyclic ketone, nitroparaffin and sulphuric or fuming sulphuric acid at another place of the said kettle.

The lactam can be isolated from the resulting acid solution in any known manner, such as by separating it by means of salts after neutralisation. Another method consists in an extraction of the neutralized solution by means of organic solvents. The raw product can be purified by means of distillation in vacuo. If, instead of lactams, their hydrolytic products, such as the ω-aminocarboxylic acids have to be prepared, the acid lactam solution is diluted with water and boiled, the $SO_4$ thereby precipitating and the filtrate is concentrated by evaporation. In order to eliminate the volatile impurities, the solution is boiled finally in the absence of a reflux cooler and the remaining impurities are eliminated before the neutralisation by extracting with a solvent, such as benzene.

It is known that the concentrated hydrochloric acid reacts with nitroparaffins, yielding hydroxylaminehydrochloride and the corresponding fatty acid or its decomposition products respectively (V. Meyer and P. Jacobsohn, Lehrbuch der organischen Chemie, I, 404–406). In the same publication however, I find a statement that concentrated sulphuric acid reacts, in most cases, with nitroparaffins in a complicated manner. Furthermore it is known from elsewhere (V. Meyer, A 171, 53) that fuming sulphuric acid reacts with nitroethane to yield ethanedisulphonic acid. Previously, the nitromethane only was known to be decomposed by fuming sulphuric acid to form carbon monoxide and hydroxylaminesulphate. In all other cases the sulphuric acid reacted with nitrocompounds at elevated temperatures to produce complicated mixtures of different compounds, such as nitrosulphonic carboxylic acids and sulphonated fatty acids, etc.

It is therefore rather surprising that different nitrohydrocarbons yield lactams almost quantitatively, when heated with cyclic ketones in the presence of hydrates of sulphur trioxide. It is preferable to add the cyclic ketone simultaneously with the nitroparaffin in order to bind the formed hydroxylamine and to change the reaction equilibrium continuously, promoting thus the formation of the lactam. It is however possible to use a two step method, adding first the nitrocompound to the sulphuric acid solution and then the ketone. Generally however this method is less desirable, causing in some cases decreased yields of the lactam.

This invention utilizes primary nitroparaffins, having the general formula $$R.CH_2.NO_2$$

where R means a hydrogen, alkyl, aryl, aralkyl or a heterocyclic radical. When using a concentrated fuming sulphuric acid, the reaction starts at relatively low temperatures or runs spontaneously at ordinary room temperature.

This reaction is strongly exothermic, requiring the dissipation of the heat of reaction which may be accomplished by externally cooling by means of liquids or vapours or by adding a volatile liquid, which boils at the reaction temperature.

It is also feasible to mix all components at room temperature and to start the reaction by a cautious heating of the mixture. According to another embodiment of this invention the nitrocompound is slowly added, admixed with the ketone or separately, into a preheated sulphuric or fuming sulphuric acid solution. In the first mentioned case, a convenient temperature to employ is 50–160° C., taking into consideration the kind of ketone used and the degree of concentration of the sulphuric or fuming sulphuric acid solution. The mixture is added with stirring to the preheated, previously reacted mixture, prepared by a cautious heating of a small amount of the original mixture. The produced surplus heat must be dissipated. It is also possible to direct the cold or the preheated mixture through a reaction zone heated to the reaction temperature in such a manner that only a small amount of the reactants are present within said zone, thereby affording a simple and efficient means of dissipating the surplus reaction heat.

A further embodiment of the invention consists in spraying the mixture into a preheated space, containing inert gases or vapours, and drawing off the reaction liquid which, condenses on the cooled walls. The cooling must not be so severe as to interfere with the reaction. If the reaction space is filled with superheated steam which may also function as a heating means, it is possible to directly carry out the hydrolysis of the lactam solution to form the respective ω-aminoacid in dilute sulphuric acid. The preheated steam pressure may also serve directly for spraying the mixture.

The invention is additionally illustrated by the following examples, but are not to be constrained as limiting the scope thereof.

Example 1

500 parts of concentrated sulphuric acid are mixed with 305 parts of nitromethane (boiling point 98–101° C.) in a vessel, provided with a reflux cooler. The vessel is placed into a heating bath, previously heated up to 123° C. After 10 minutes, the bath temperature being 120° C., 440 parts of cyclohexanone (90%) is slowly added. At first vapors distilled and returned by reflux into the vessel. After a short period of time the reflux stopped. Then the mixture was heated for 5 more minutes at a temperature of 120–125° C. After cooling, the mixture was poured slowly into aqueous ammonia, thus preventing the temperature from rising above 36° C. The final reaction was weakly alkaline. After standing for a while, the oily upper layer in an amount of 500 parts was separated and distilled in vacuo. The yield of pure 6-caprolactam (B. P. 138–139° C. at 8–9 mm. Hg) a yield of 78.9%, based on the amount of cyclohexanone used was 360 parts.

Example 2

A mixture of nitroparaffins, obtained by reacting nitrogen oxides with the low boiling or uncondensed fraction of earth gas, was mixed with an equivalent amount of cyclohexanone. The mixture was continuously added to an externally cooled vessel, provided with a reflux cooler and a stirring device and containing a preheated concentrated sulphuric acid solution at such a velocity in order to maintain the temperature below 120° C. The mixture was continuously withdrawn from the vessel through a long tube, submerged in a bath, having a temperature of 125–130° C., the cold concentrated sulphuric acid being supplied simultaneously into the reaction vessel. The supply of the nitroparaffin-cyclohexanone mixture was regulated by means of a sensitive thermostat in order to accommodate the supply to the efficiency of the reflux cooler. The lactam was isolated from the reaction mixture by the same means as described in Example 1, a yield greater than 90% of the theoretical was obtained. The aqueous mother liquor contained different fatty acids which can be isolated in any known manner.

What is claimed by Letters Patent is:

1. A method of producing lactams and fatty acids simultaneously which comprises reacting primary nitroalkanes having more than one carbon atom with an alicyclic mono-ketone in the presence of a sulfur trioxide hydrate at a temperature up to about 160° C., separating the lactam from the fatty acid, and recovering the lactam and the fatty acid.

2. A continuous method of producing lactams and fatty acids simultaneously which comprises introducing concurrently primary nitroalkanes having more than one carbon atom and alicyclic mono-ketones into a preheated solution of sulfur trioxide hydrate, maintaining the reaction mixture at a maximum temperature of about 160° C., continuously withdrawing the reaction products consisting essentially of lactams and fatty acids, separating the lactams from the fatty acids, and recovering the lactams and the fatty acids.

3. A method of producing lactams and fatty acids simultaneously which comprises introducing concurrently primary nitroalkanes having more than one carbon atom and alicyclic mono-ketones into a preheated solution of sulfur trioxide hydrate, maintaining the reaction mixture at a maximum temperature of about 160° C., separating said lactam from said fatty acids, and recovering the lactams and the fatty acids.

4. A method of producing lactams and fatty acids simultaneously which comprises introducing an alicyclic mono-ketone into a preheated mixture of primary nitroalkanes and sulfur trioxide hydrates, cooling the reaction mixture to a maximum temperature of about 160° C., separating and recovering lactams and fatty acids.

5. A method of producing lactams which comprises reacting primary nitroalkanes with alicyclic mono-ketones in the presence of sulfur trioxide hydrates at a maximum temperature of about 160° C., and recovering said lactams.

6. A method of producing substantially pure lactams which comprises introducing an alicyclic mono-ketone into a preheated mixture of primary nitroalkanes and sulfur trioxide hydrates, cooling the reaction mixture to a maximum temperature of about 160° C., and recovering a lactam.

7. A method of producing substantially pure 6-caprolactam which comprises introducing cyclohexanone into a preheated mixture of nitromethane and concentrated sulfuric acid, cooling the reaction mixture to a maximum temperature of about 160° C., and recovering 6-caprolactam.

8. A method of producing lactams and fatty acids simultaneously which comprises reacting a mixture of low molecular primary nitroalkanes with cyclohexanone in the presence of a concentrated sulfuric acid at a temperature up to about 160° C., separating the lactam from the fatty acid, and recovering the lactam and the fatty acid.

9. A method of producing lactams and fatty acids simultaneously which comprises spraying a mixture comprising primary nitroalkanes containing more than 1 carbon atom, an alicyclic mono-ketone and sulfur trioxide hydrates into an inert medium maintained at a maximum temperature of about 160° C., collecting the reaction products, separating and recovering said lactams and fatty acids.

ALOIS NOVOTNY.

REFERENCES CITED

The following references are of record in the file of this patent:

UNITED STATES PATENTS

| Number | Name | Date |
|---|---|---|
| 2,297,520 | Wiest et al. | Sept. 29, 1942 |
| 2,313,026 | Schlack | Mar. 2, 1943 |
| 2,351,381 | Weist | June 13, 1944 |

FOREIGN PATENTS

| Number | Country | Date |
|---|---|---|
| 237,392 | Switzerland | Aug. 1, 1945 |

OTHER REFERENCES

Degering, An Outline of Organic Nitrogen Compounds (University Lithoprinters, Ypsilanti, Mich.), 1945 pp. 75 and 76.

Hass, Ind. and Eng. Chem., vol. 35 (1943) p. 1149.

Preibisch, Jour. Prakt. Chem. (115) (2) 7 (1873) p. 480.

Moncrieff, Manufacturing Chemist and Manufacturing Perfumer, vol. XVII (June, 1946) p. 231.